Figure 4:
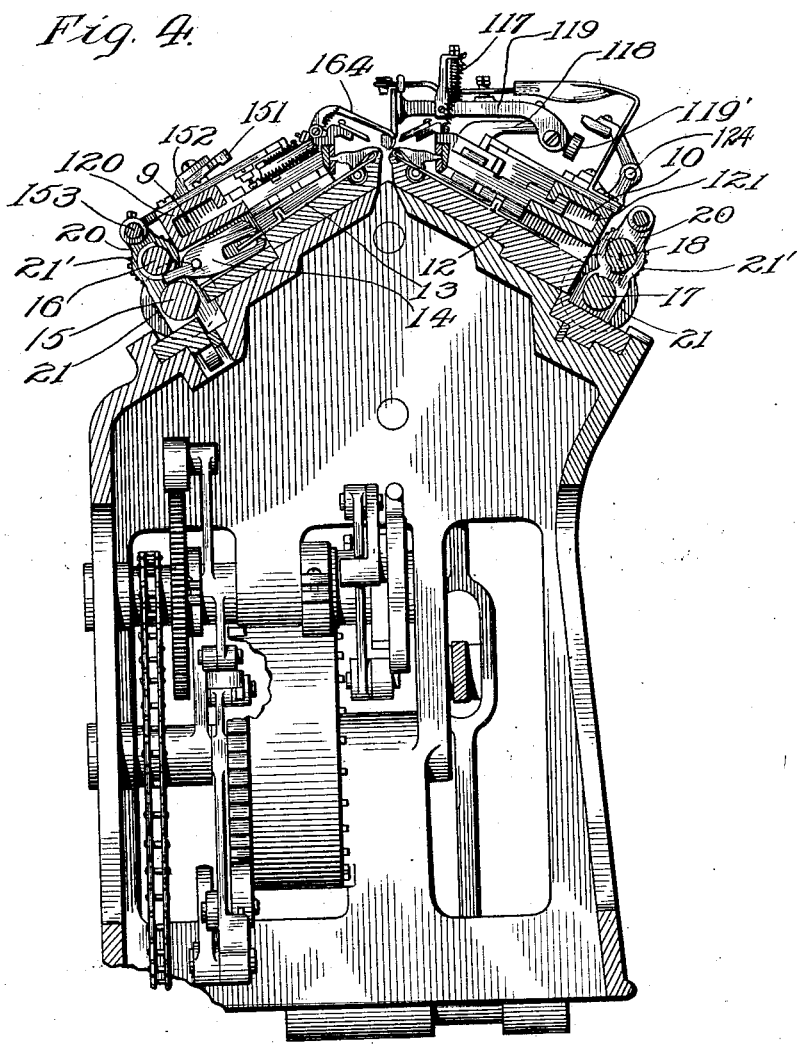

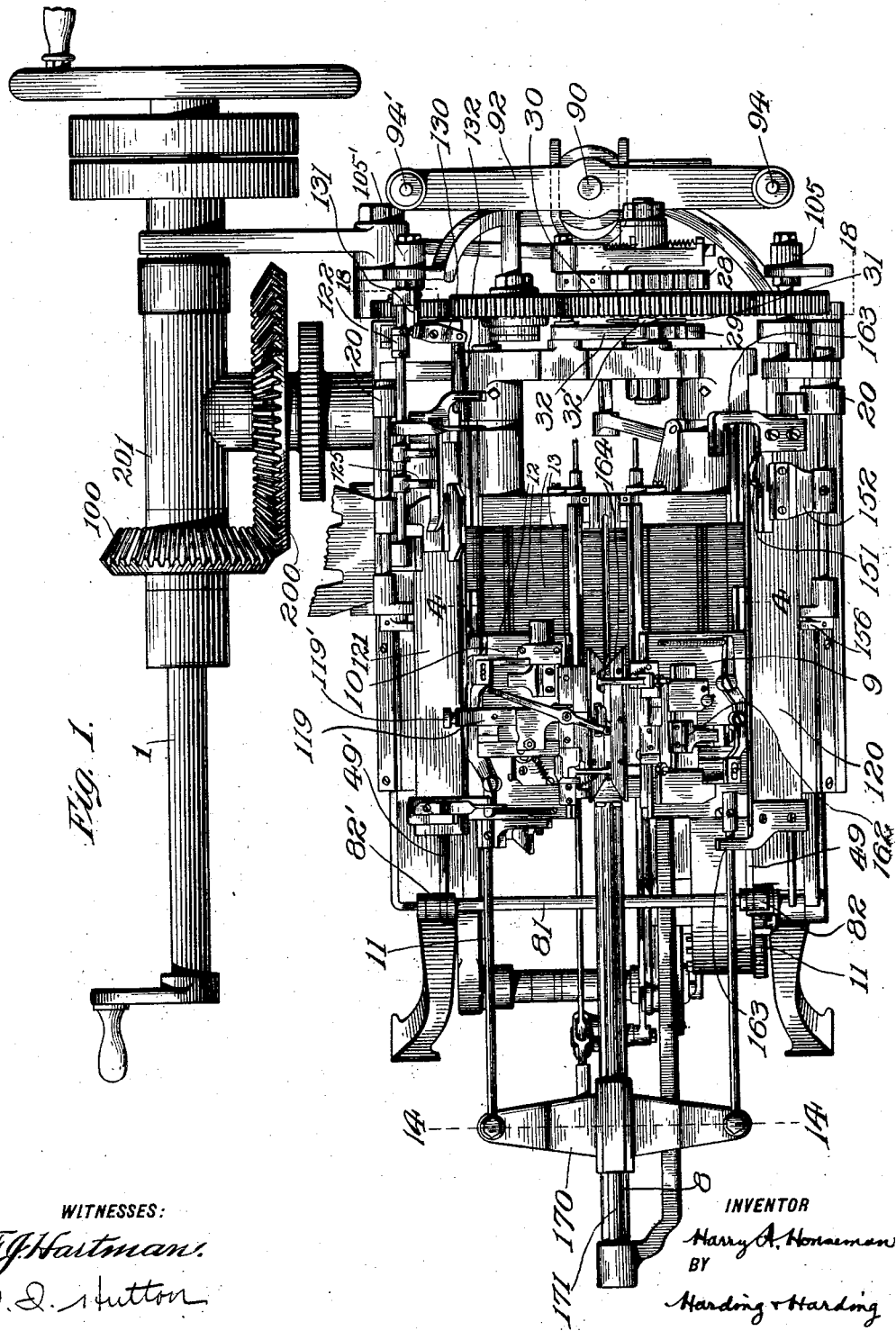

No. 755,135. PATENTED MAR. 22, 1904.
H. A. HOUSEMAN.
STRAIGHT KNITTING MACHINE.
APPLICATION FILED MAY 5, 1903.
NO MODEL. 11 SHEETS—SHEET 2.
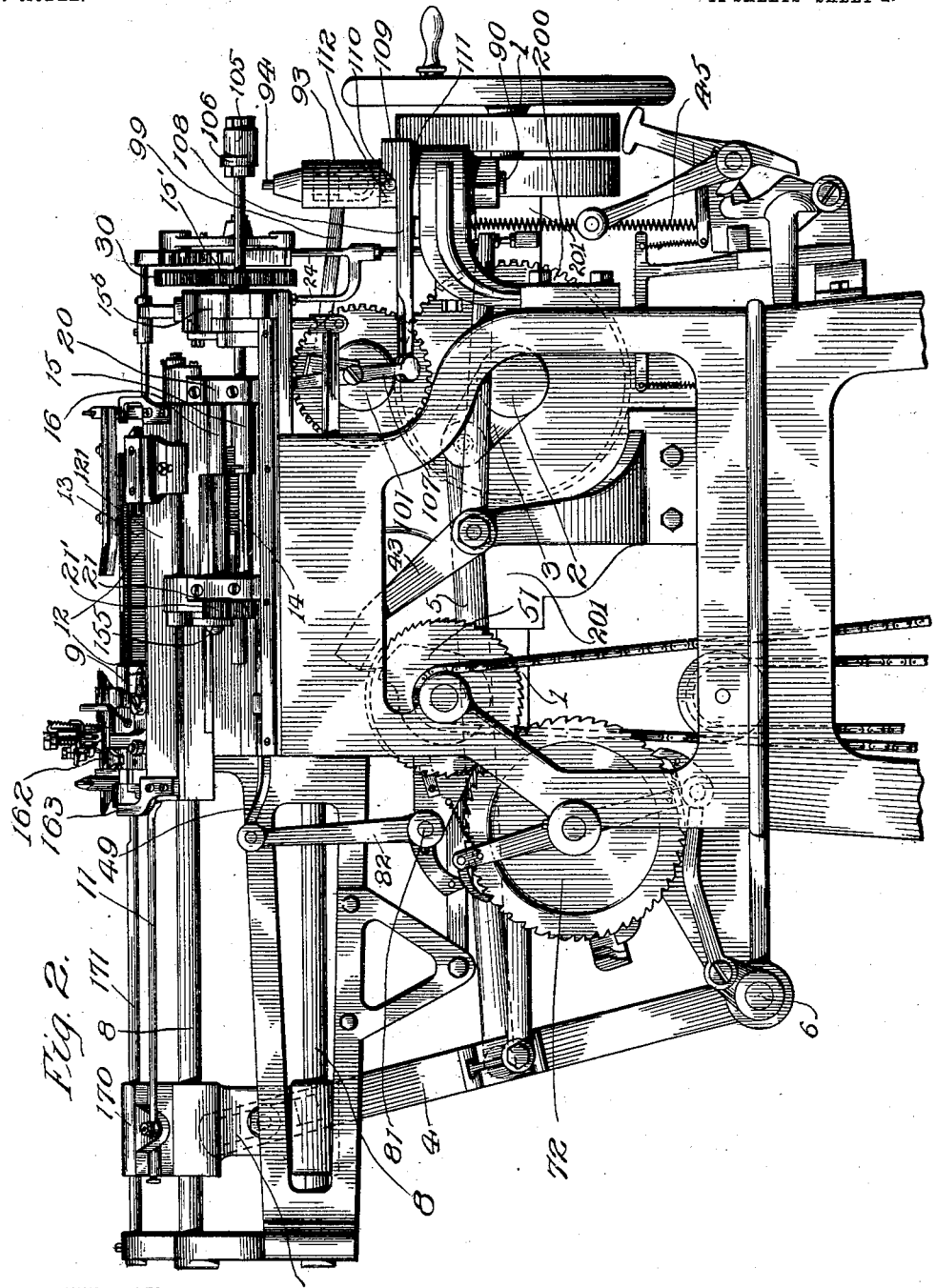

No. 755,135. PATENTED MAR. 22, 1904.
H. A. HOUSEMAN.
STRAIGHT KNITTING MACHINE.
APPLICATION FILED MAY 5, 1903.
NO MODEL. 11 SHEETS—SHEET 3.
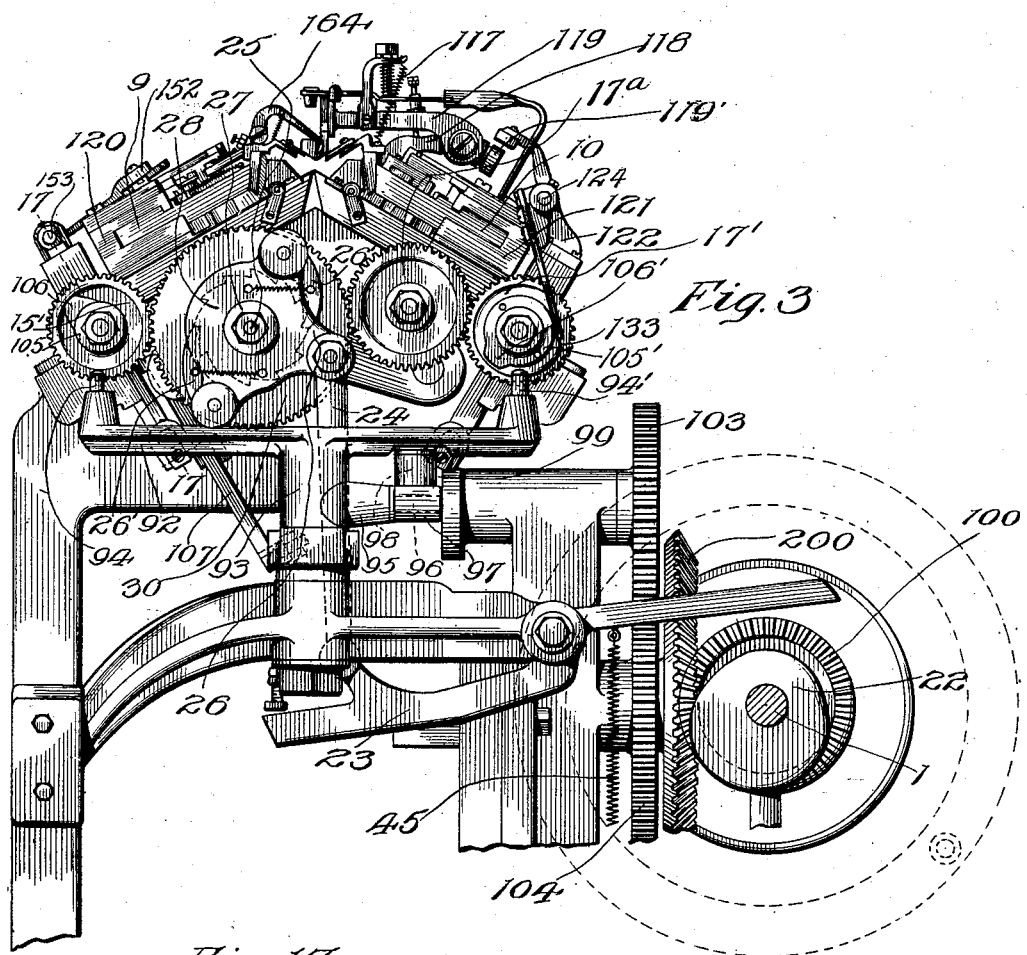
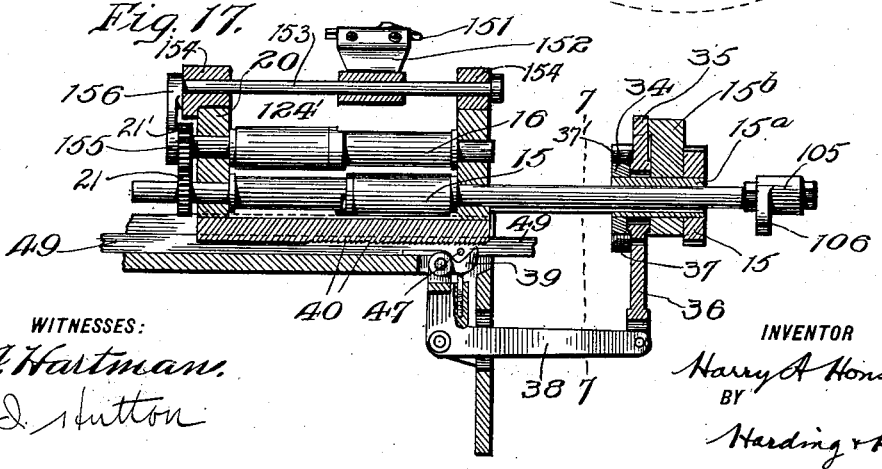
WITNESSES:
F. J. Hartman
G. D. Hutton
INVENTOR
Harry A. Houseman
BY
Harding & Harding
ATTORNEYS.

No. 755,135. PATENTED MAR. 22, 1904.
H. A. HOUSEMAN.
STRAIGHT KNITTING MACHINE.
APPLICATION FILED MAY 5, 1903.
NO MODEL. 11 SHEETS—SHEET 4.

WITNESSES:
F. J. Hartman
G. D. Hutton

INVENTOR
Harry A. Houseman
BY
Harding & Harding
ATTORNEYS.

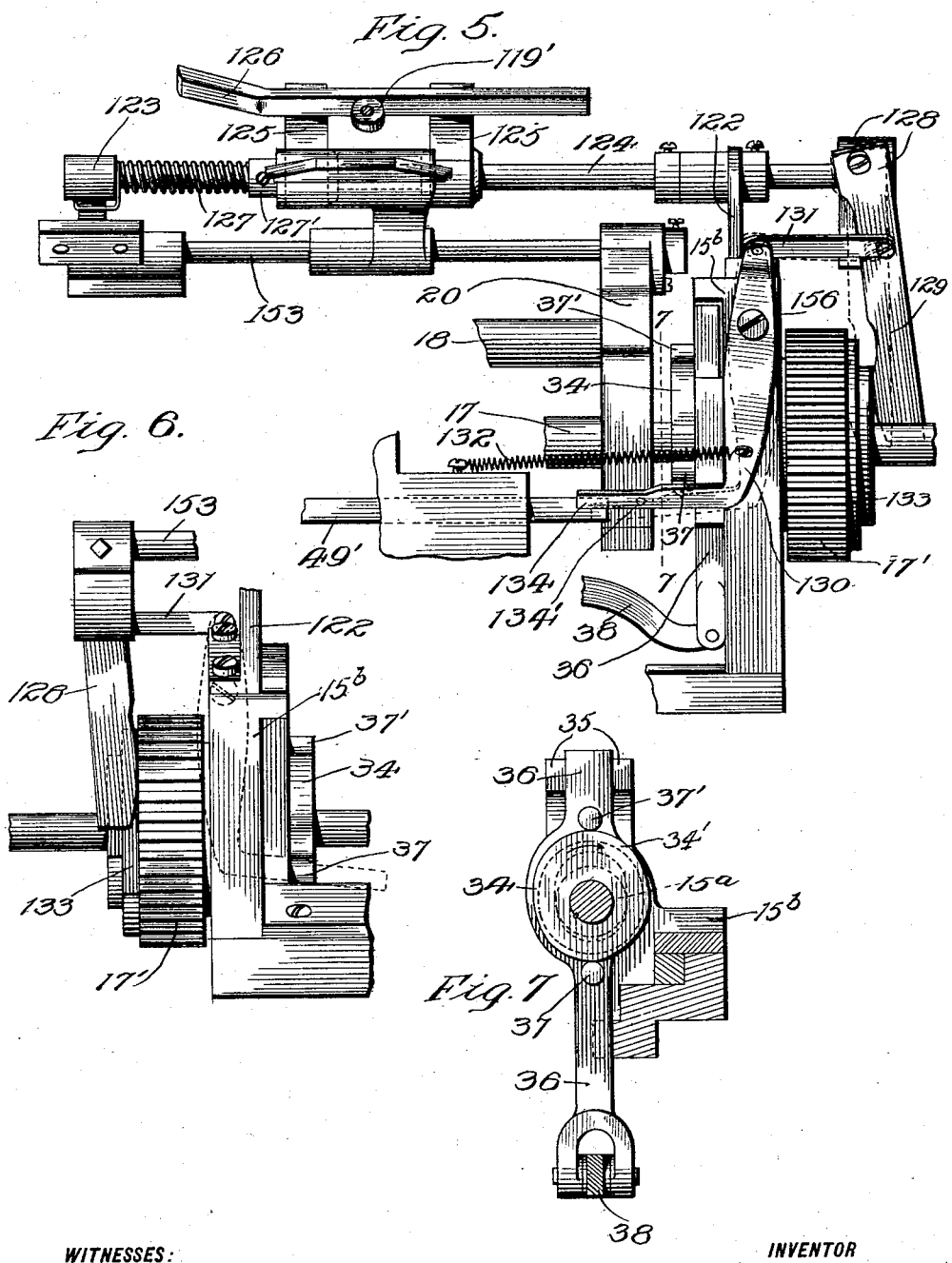

No. 755,135. PATENTED MAR. 22, 1904.
H. A. HOUSEMAN.
STRAIGHT KNITTING MACHINE.
APPLICATION FILED MAY 5, 1903.
NO MODEL. 11 SHEETS—SHEET 6.

WITNESSES:
F. J. Hartman.
G. E. Hutton

INVENTOR
Harry A. Houseman
BY
Harding & Harding
ATTORNEYS

No. 755,135. PATENTED MAR. 22, 1904.
H. A. HOUSEMAN.
STRAIGHT KNITTING MACHINE.
APPLICATION FILED MAY 5, 1903.
NO MODEL. 11 SHEETS—SHEET 7.

WITNESSES:
F. J. Hartman.
G. D. Hutton

INVENTOR
Harry A. Houseman
BY
Harding & Harding
ATTORNEYS.

No. 755,135. PATENTED MAR. 22, 1904.
H. A. HOUSEMAN.
STRAIGHT KNITTING MACHINE.
APPLICATION FILED MAY 5, 1903.
NO MODEL. 11 SHEETS—SHEET 9.

WITNESSES:
F. J. Hartman.
M. H. Ellis.

INVENTOR
Harry A. Houseman
BY
Harding & Harding
ATTORNEYS

No. 755,135. PATENTED MAR. 22, 1904.
H. A. HOUSEMAN.
STRAIGHT KNITTING MACHINE.
APPLICATION FILED MAY 5, 1903.
NO MODEL. 11 SHEETS—SHEET 10.
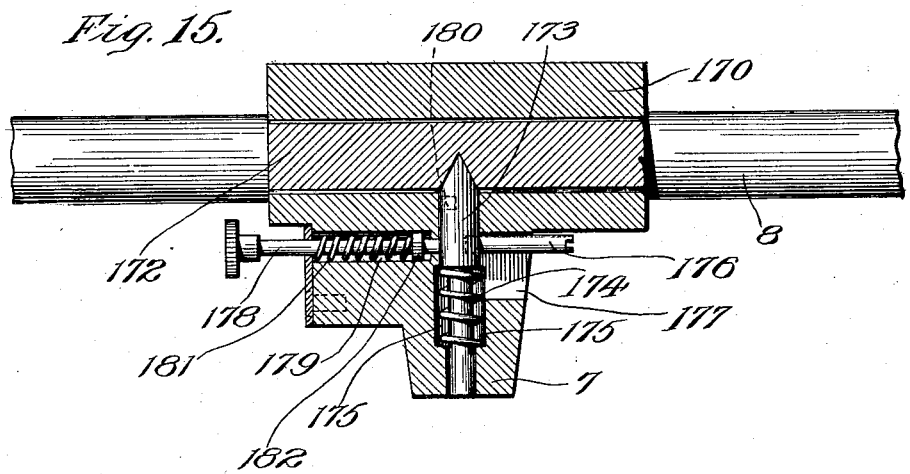
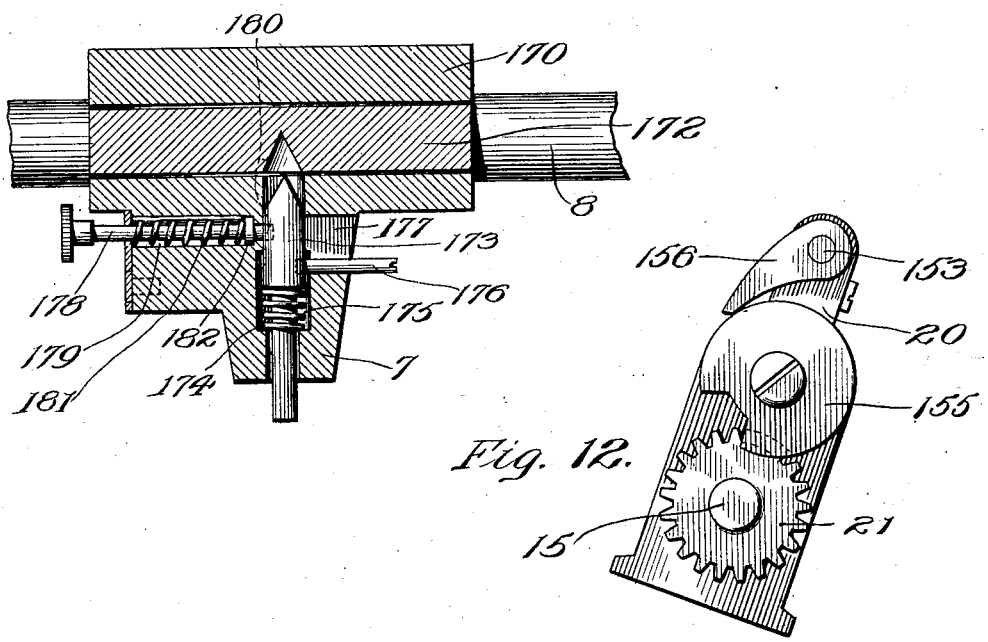
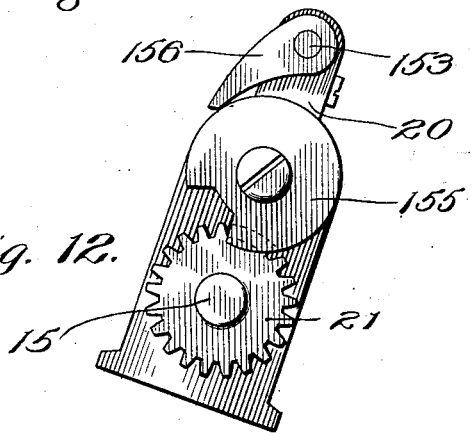
WITNESSES:
INVENTOR
Harry A. Houseman
BY
Harding & Harding
ATTORNEYS No. 755,135. PATENTED MAR. 22, 1904.
H. A. HOUSEMAN.
STRAIGHT KNITTING MACHINE.
APPLICATION FILED MAY 5, 1903.
NO MODEL. 11 SHEETS—SHEET 11.

WITNESSES:
F. J. Hartman
G. D. Hutton

INVENTOR
Harry A. Houseman
BY
Harding & Harding
ATTORNEYS

No. 755,135. Patented March 22, 1904.

UNITED STATES PATENT OFFICE.

HARRY A. HOUSEMAN, OF PHILADELPHIA, PENNSYLVANIA, ASSIGNOR TO STANDARD MACHINE COMPANY, OF PHILADELPHIA, PENNSYLVANIA, A CORPORATION OF PENNSYLVANIA.

STRAIGHT-KNITTING MACHINE.

SPECIFICATION forming part of Letters Patent No. 755,135, dated March 22, 1904.

Application filed May 5, 1903. Serial No. 155,732. (No model.)

*To all whom it may concern:*

Be it known that I, HARRY A. HOUSEMAN, a citizen of the United States, residing at Philadelphia, county of Philadelphia, and State of Pennsylvania, have invented a new and useful Improvement in Straight-Knitting Machines, of which the following is a full, clear, and exact description, reference being had to the accompanying drawings, which form a part of this specification.

The object of my invention is to improve the machine set forth in my Patents Nos. 663,900 and 663,901, dated December 18, 1900.

My invention consists in a novel arrangement of needle-actuating cams, in novel means for controlling certain of said cams from the pattern mechanism, in novel means for moving the yarn-carrier out of operation, in an improved latch-opener designed to act upon needles bent out of alinement, and in novel means for automatically disengaging the knitting-cam plates from the driving mechanism in case of any derangement serving to obstruct the movement of the cam-plates.

Figure 8:
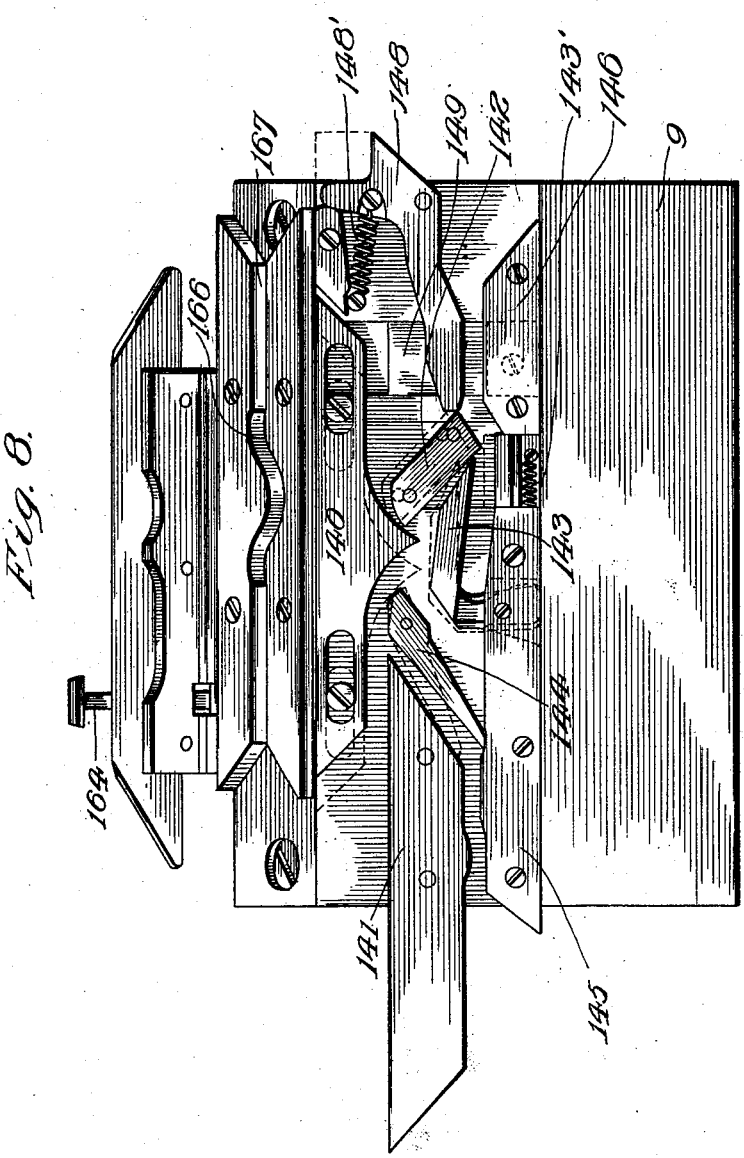
Figure 9:
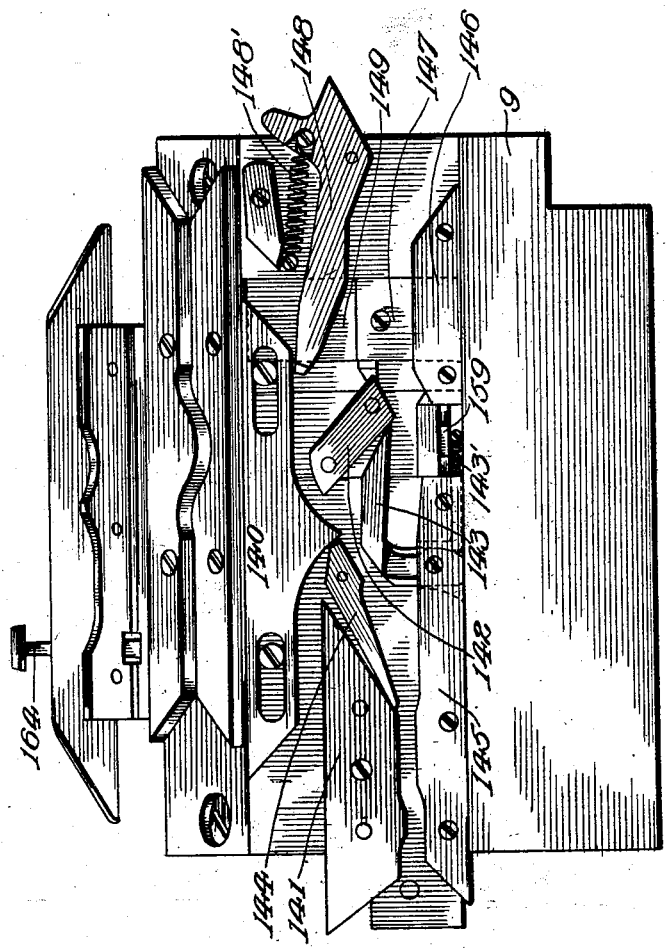
Figure 10:
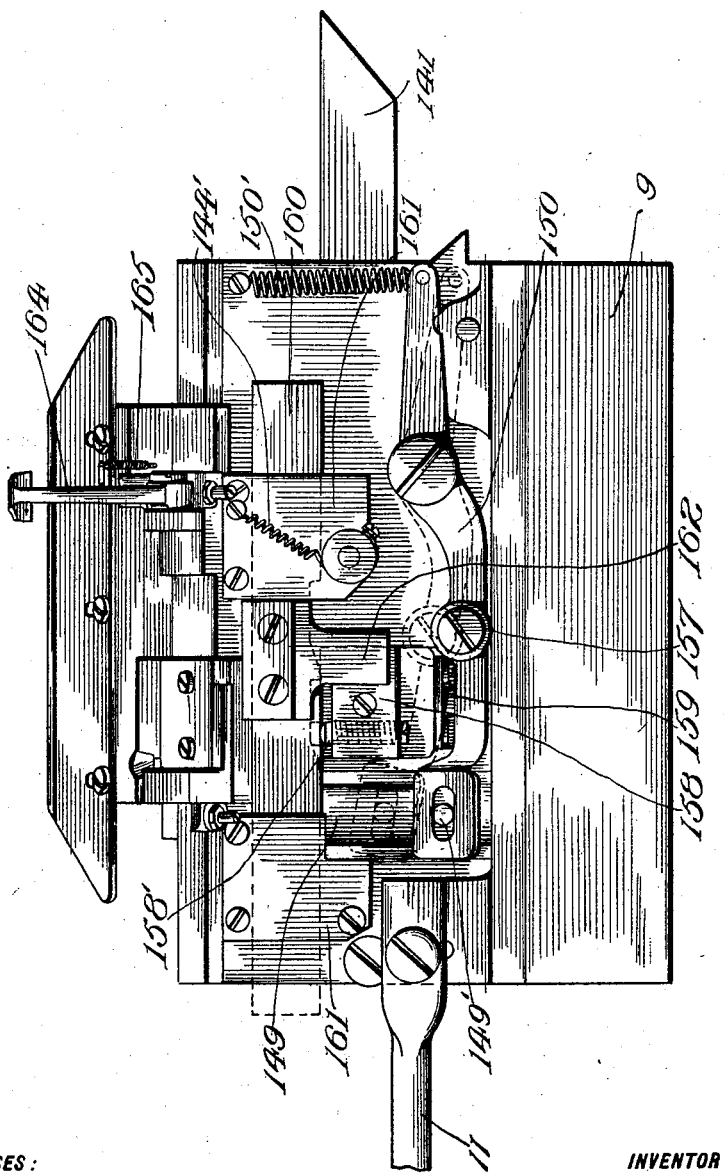
Figure 11:
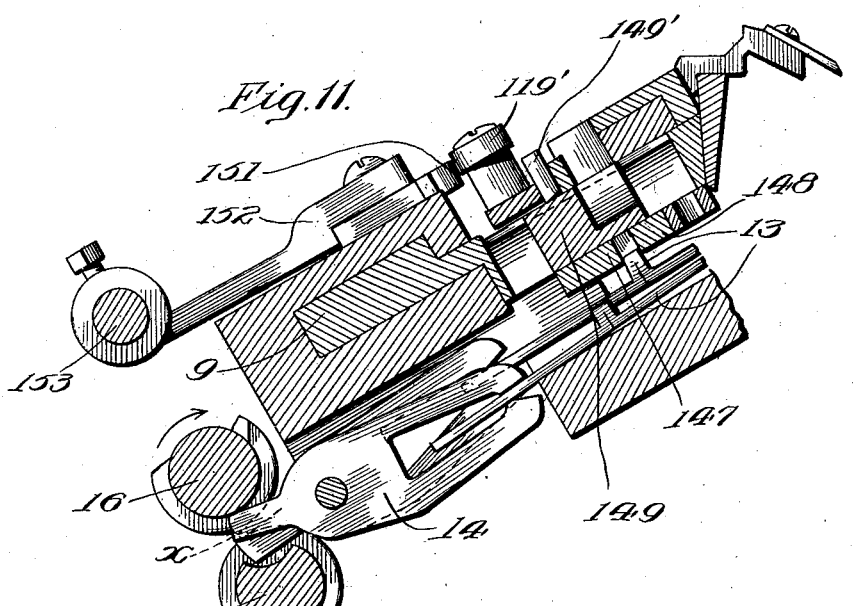
Figure 18:
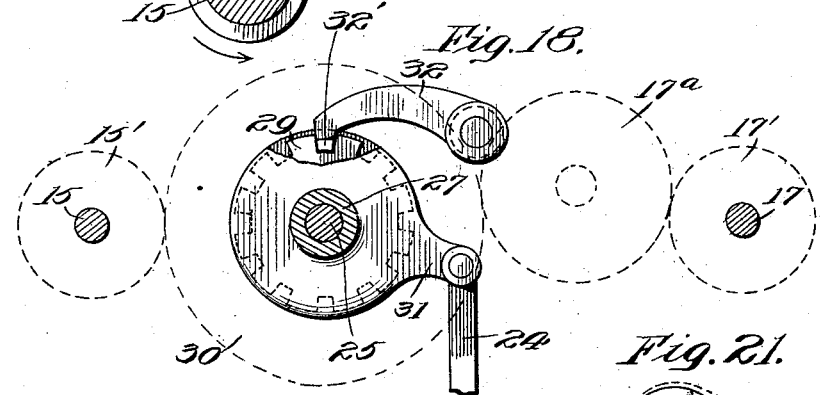
Figure 21:
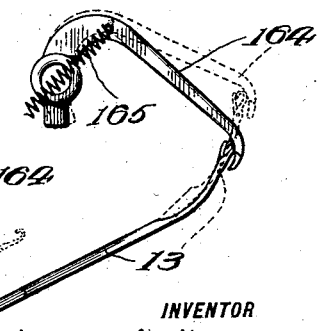
Figures 19, 20:
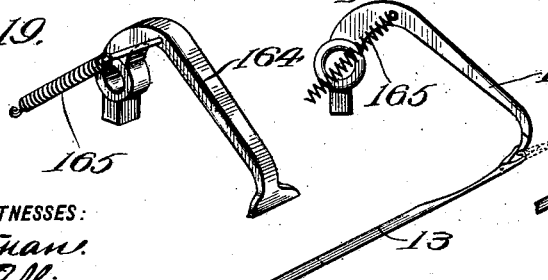
Figure 13:
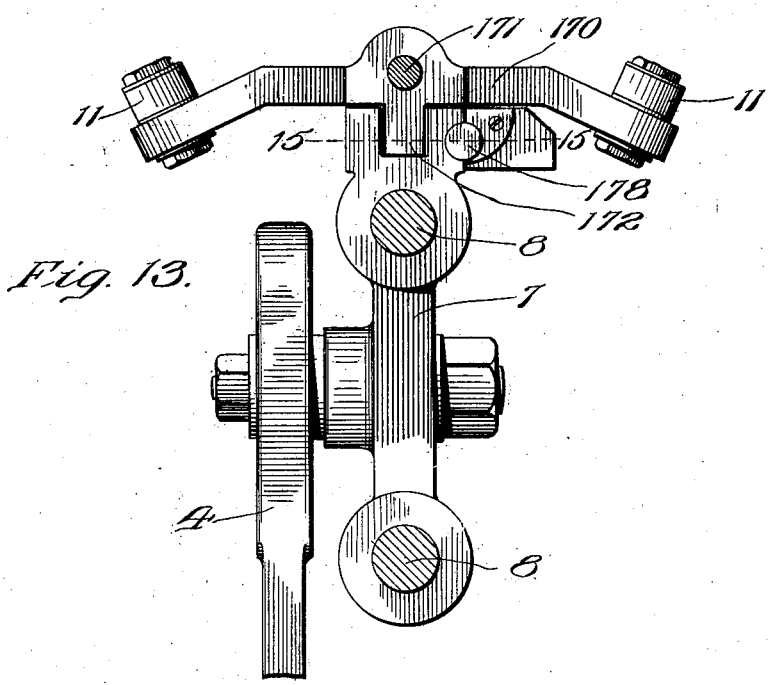
Figure 14:
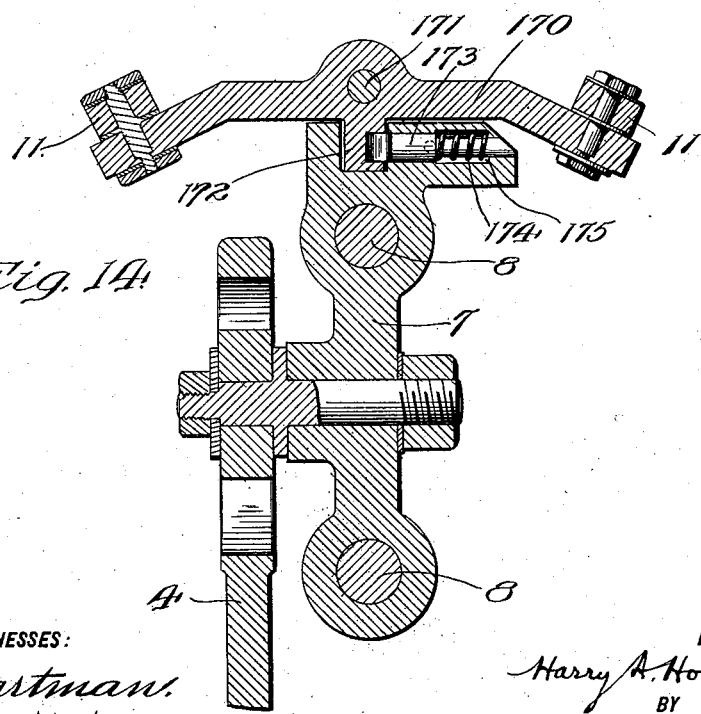

Figure 1 is a plan view. Fig. 2 is a side elevation. Fig. 3 is an end view. Fig. 4 is a transverse section on line 4 4 of Fig. 1. Fig. 5 is a side elevation of the yarn-carrier-actuating mechanism. Fig. 6 is a rear view of a portion of said mechanism. Fig. 7 is a section on the line 7 7 of Fig. 5. Fig. 8 is a bottom plan view of one set of the knitting-cams, the full lines representing the positions of the cam during their forward movement while the needles are passing into and out of knitting position, the dotted lines representing the positions of the cams during their backward movement while the needles passing through them are held out of operative position. Fig. 9 is a similar view of one set of the knitting-cams during their backward movement, and also showing the needle-lifting cam for causing a single needle to knit with the opposite bank. Fig. 10 is a top plan view of one of the knitting-cam plates, the knitting-cam-actuating mechanism, and the latch-opener. Fig. 11 is a sectional view of the pattern-rolls, needle-levers and needles, cam-plate and cams for coöperating with the needle designed to knit with the needles of the opposite bank, and the mechanism for actuating the needle-lifting cam. Fig. 12 is an end view of the pattern-rolls, showing the cam and dog for controlling the needle - lifter-cam - actuating mechanism. Fig. 13 is an end view of the cross-heads for operating the cam-plates. Fig. 14 is a vertical section of the same through line 14 14 of Fig. 1. Fig. 15 is a horizontal section in line 15 15 of Fig. 13, showing the cross-heads connected. Fig. 16 is a view similar to Fig. 13, showing the cross-heads disconnected. Fig. 17 is a detail section on the line 17 17 of Fig. 3, showing the pattern-rolls and mechanism for actuating the same and a portion of the needle - lifter - cam - actuating mechanism. Fig. 18 is a section on the line 18 18 of Fig. 1. Fig. 19 is a perspective view of the latch-opener. Fig. 20 is a side view of the latch-opener, showing its mode of operation in connection with a perfect needle in its normal position. Fig. 21 is a side view of the latch-opener, showing its mode of operation in connection with a needle bent up.

1 is the main driving-shaft, and 2 the crank-shaft, both supported in the sleeved bearing 201 on the frame of the machine. On the main driving-shaft is the bevel-gear 100 and on the crank-shaft is the bevel-gear 200, meshing with the bevel-gear 100, whereby the crank-shaft is driven.

3 is the crank, and 4 the rocking lever, which is connected to crank 3 by means of connecting-rod 5. The rocking lever 4 is connected at one end to the shaft 6 and at the other end to a constantly-reciprocating device consisting of the cross-head 7, which reciprocates on the rod 8, and the cross-head 170, detachably secured (by means hereinafter described) to the cross-head 7 and which reciprocates on the rod 171.

9 is the knitting-cam plate for the front bank of needles, and 10 the knitting-cam plate for the rear bank of needles.

120 and 121 are cam-guides along which the knitting-cam plates 9 and 10 are adapted to slide. The knitting-cam plates are connected to the cross-head 170 by means of the links 11. 12 and 13 are the needles. The needles 12 are the regular needles used on every round of knitting, and 13 represents the fashioning-needles, the same being shown at the right-hand end of the needle-bed in Figs. 1 and 2. The needles 13 are raised into and out of alinement with the knitting-cams in a direction at substantial right angles to their length by means of the pivoted needle-levers 14. The needle-levers of the front bank are controlled by the pattern-rolls 15 and 16, while the needle-levers of the rear bank are controlled by the pattern-rolls 17 and 18. The two pairs of rolls have a longitudinal movement and a rotary movement, the longitudinal movement setting the rolls to control additional fashioning-needles one at a time and the rotation of the rolls dictating the fashioning-needles to be thrown into and out of action at each reciprocation in order to make the cross-stitching to close up the hole produced by the throwing in of an additional needle, thus making the tubular fabric described and claimed in the patent issued to Frank Wilcomb, No. 654,694, dated July 31, 1900, the operation, broadly, being the same as that described in the patent issued to Frank Wilcomb, No. 654,695, dated July 31, 1900, and specifically the same as that described in the patents issued to me, Nos. 663,900 and 663,901, dated December 18, 1900. The specific construction of these rolls does not differ from that set out in my Patent No. 663,901, and their operation and the method by which they control the fashioning-needle levers are the same. They will therefore be only briefly described, reference being made to the last-named patent for a full description of their construction and operation.

15 is the lower roll and 16 the upper roll of the pair of rolls for controlling the front bank of fashioning-needles, and 17 is the lower roll and 18 the upper roll controlling the rear bank of fashioning-needles. The rolls of each pair of rolls rotate in unison in opposite directions. Each roll is provided with projections and depressions of varying longitudinal extent, the projections on one roll registering with the depressions on the other roll. The rolls are given a step-by-step rotation, six turns being necessary to impart to a roll a complete rotation, although the number of turns may be varied with the pattern. The raised sections impart to the needle-levers the necessary pivotal movement to bring their corresponding needles into and out of alinement with the knitting-cams hereinafter described. One of the rolls of each pair is provided with a high projection $x$, which tilts the single needle-lever which at any one time it controls a sufficient distance to move its corresponding needle a sufficient distance above the needle-bed to be actuated by a special cam, hereinafter described, that causes said needle to knit with the needles of the opposite bank.

The rolls are stationary during circular knitting, and are only actuated during fashioning. Assume that a portion only of the fashioning-needles are in operation and that it is desired to widen. Both pairs of rolls are simultaneously turned, rolls 17 and 18 moving all the needles of the rear bank out of action. The knitting-cams then travel, say, from left to right, knitting on the front bank of needles, and the rear rolls are shifted longitudinally a distance of one needle. The rolls are now given a second turn, rolls 17 and 18 moving the appropriate needles of the rear bank into knitting position and rolls 15 and 16 moving all the needles of the front bank out of action. The knitting-cams now travel from right to left, knitting on the rear bank of needles, and the front rolls are shifted longitudinally a distance of one needle. The rolls are then given a third turn, rolls 15 and 16 moving the appropriate needles of the front bank into knitting position, and the high point $x$ of roll 18 of the rear pair of rolls moving one of the needles of the rear bank into position to knit with the needles of the front bank during the subsequent travel of the knitting-cams from left to right. The rolls are then given a fourth turn, causing the high point $x$ of roll 16 of the front pair of rolls to move one of the needles of the front bank into position to knit with the needles of the rear bank during the subsequent travel of the knitting-cams from right to left. The rolls are then given a fifth turn. The knitting-cams then travel from left to right, knitting on the front bank. The rolls are then given a sixth turn, returning the rolls to their initial position. The stitch is now formed, and by the described longitudinal shifting of the rolls an additional needle in each bank is brought into operation. So long as the rolls remain in this initial position the circular fabric knit will be wider to the extent of the two additional needles thus brought into action. To continue to widen, the rolls are given another series of six turns and shifted longitudinally, as described, and this is continued until the fabric is widened to the desired extent.

The mechanism for actuating the rolls is the same as that set forth in my Patent No. 663,901, and will now be described.

The rolls are journaled in a frame or slide 20, each of the rolls 15 and 17 being directly actuated and geared, respectively, to the rolls 16 and 18, as hereinafter described. On the main driving-shaft is the cam 22.

23 is a rocking lever pivoted between its ends to the frame of the machine and having one end in line of travel of the cam, against which it is held by spring 45, and having pivoted to it near its other end the link 24, which at its other end is bifurcated, one arm being pivoted to the pawl-carrier 26, loose on the stationary shaft 25. This shaft 25 also has the loose sleeve 27, to which is secured a ratchet-wheel 28, having twelve teeth, a locking-wheel 29, having twelve indents, and a gear-wheel 30. Loose upon the sleeve 27 and between the gear-wheel 30 and the locking-wheel 29 is a cam-plate 31, pivoted to the other arm of link 24. The pawl-carrier 26 is provided with two pawls 26' 26', which act upon the ratchet-wheel 28.

32 is a locking-dog, pivoted to the machine-frame and adapted to engage the indents in locking-wheel 29 and having a lateral projection 32' in line of movement of the cam-plate 31.

The operation of the parts just described is as follows: At each revolution of the main shaft the lever 23 and link 24 and pawl-carrier 26 are oscillated, causing the pawls 26' 26' on the return movement of pawl-carrier 26 to engage the ratchet-wheel 28 and turn it, together with locking-wheel 29 and gear-wheel 30, a one-twelfth turn. At the end of each one-twelfth rotation of these wheels the locking-dog 32 drops into an indent in locking-wheel 29, thus preventing the ratchet-wheel 28 being carried by momentum beyond a one-twelfth turn. While the parts just described are stationary, the lateral projection 32' of dog 32 rests on the low part of the periphery of cam-plate 31. During the backward movement of lever 24 the cam-plate 31 is turned to bring the high part of its periphery under the lateral projection 32' of dog 32, withdrawing the dog from engagement with the locking-wheel. During the forward movement of link 24 and during the rocking forward of the ratchet-wheel 28, locking-wheel 29, and gear 30 the cam-plate 31 is turned in the opposite direction, which again brings its low part under the lateral projection 32' of dog 32, so that the latter is in position to engage the locking-wheel at the end of its forward turning movement.

The object of the foregoing mechanism is to impart to the gear 30 a one-twelfth turn at each rotation of the driving-shaft 1 and lock it from moving beyond a one-twelfth turn.

The gear 30 meshes directly with gear 15' on the shaft of roll 15. At the other side it meshes directly with gear 17$^a$, which in turn meshes with gear 17' on the shaft of roll 17. The shaft of roll 15 also has the gear 21, which meshes with gear 21' on the shaft of roll 16, and the shaft of roll 17 is geared in a similar manner to the shaft of roll 18. The gear 30 is of twice the circumference of gears 15' and 17', so that with every one-twelfth turn of gear 30 a one-sixth turn is imparted to the rolls 15, 16, 17, and 18, as before described.

The gears 15' and 17' are not directly fastened to the roll-shafts, but are each secured to a sleeve 15$^a$, journaled in a bearing 15$^b$, said sleeve being splined to the shaft of the roll, so that the shaft of the roll will rotate with the sleeve, but may move longitudinally independent of the sleeve.

I will now describe the mechanism for shifting the rolls 15 and 16 longitudinally at one point in the complete rotation of the rolls, as before described. This mechanism is the same in most respects as that set forth in my Patent No. 663,901. Secured to the sleeve 15$^a$ is the cam 34. Sliding on the sleeve 15$^a$ and between the projections 35 on the bearing 15$^b$ is the bar 36, having the rollers 37 37'. The bar 36 is connected to one arm of the bell-crank 38, the other arm of this bell-crank carrying the pawl 39, working in the rack 40 on the slide 20. When the raised part 34' of the cam 34 strikes the roller 37, it will depress bar 36, turn bell-crank 38, and cause pawl 39 to advance the slide 20 the distance of one tooth. When the raised part of the cam 34 strikes the roller 37', it will raise bar 36 and return the bell-crank 38 to its normal position, bringing the pawl 39 back to engage the next tooth.

The mechanism for shifting longitudinally rolls 17 and 18 is a duplicate of that just described for shifting rolls 15 and 16.

The mechanism for holding the rolls stationary at any desired point during the fashioning and also before the fashioning is begun and after the fashioning is completed will not be described in detail, as it is the same as in my Patent No. 663,901. The following is a general description of the same: To hold the rolls stationary, it is necessary to hold the rocking lever 23 out of engagement with the cam 22. This is effected by the pivoted lever 43, one end of which is lifted by the high point of a cam 51, whereby the other end is depressed and held against one end of lever 23, thus holding the other end of lever 23 away from cam 22. When it is desired to render the roll-turning mechanism operative, the pattern-drum 72 actuates mechanism (not illustrated) to cause the cam 51 to be turned, whereupon said lever 43 rides over the concentric portion of cam 51 and recedes from lever 23, which by means of spring 45 is brought into engagement with cam 22.

After all the fashioning-needles have been thrown into action and the required length of wide fabric has been knit and it is desired to throw all the fashioning-needles out of action, so as to start on the narrow goods, I provide the following mechanism, which is the same as that set forth in my Patent No. 663,901, for returning the rolls to their initial position:

90 is a post supported on a bracket on the machine-frame.

92 is a rocking lever having a sleeve 93 loose on the post 90.

94 94' are striking-pins on the ends of lever 92.

95 is a bracket on sleeve 93, having the pin 96. Surrounding this pin is a collar 97, having a projection 98.

99 is a connecting-rod the end of which surrounds projection 98, the other end of the rod being pivoted on crank-disk 101 on the shaft of gear 103, driven by gear 104 on shaft 2. By this mechanism the rocking lever 92 is constantly reciprocated, there being one complete reciprocation to two turns of the pattern-rolls.

105 105' are collars secured to the shafts of rolls 15 and 17 and have lugs 106 106' projecting therefrom. When it is desired to return the rolls to their initial position, the rocking lever 92, through its sleeve 93, is elevated by suitably-timed automatic mechanism, to be hereinafter described, so that the striking-pins 94 94' will be in alinement with lugs 106 106' when the roller-shafts are turned to one of their six positions. In the case of rollers 15 and 16 the lug 106 on the shaft of roll 15 will be brought into line of travel of the striking-pin 94 after roll 15 has engaged the needle-levers to move the fashioning-needles of the front bank out of action, and while the cam-cylinder is acting upon the needles of the rear bank the pin 94 strikes the lug 106, returning the roll-carrying frame or slide 20 and rolls 15 and 16 to their initial position. In the case of rollers 17 and 18 the lug 106' on the shaft of roll 17 will be brought into line of travel of the striking-pin 94' after roll 17 has engaged the needle-levers to move the fashioning-needles of the rear bank out of action, and while the cam-cylinder is acting upon the needles of the front bank the pin 94' strikes the lug 106', returning rolls 17 and 18 to their initial position.

The mechanism for releasing the pawl 39 to permit the return of the rolls consists of the pawl-releasing bar 49 49', one on each side of the machine, each having the pin 47, which is moved forwardly just before the roll-returning mechanism is brought into action to disengage the pawl 39 from the ratchet on the roll-frame. The bars 49 49' are operated by means of the levers 82 82', secured to the shaft 81, the latter being turned in one direction to operate the bars 49 49' to permit the rolls to be returned at the conclusion of the knitting and being immediately thereafter turned in the other direction to restore the bars 49 49' to their normal position by means of mechanism (not shown) controlled by the pattern-drum 72 and fully described in my Patent No. 663,901.

The mechanism for lifting the rocking lever 92 and its sleeve 93 to effect the return of the rolls is the same as that set forth in my Patent No. 663,901 and is as follows: To one end of the bar 49 is pivoted a lever 107, pivoted between its ends to the machine-frame and pivoted at the other end to one end of a bar 108. The other end of this bar 108 is bifurcated, and the two forks are provided with cams 109 in alinement with pins 110 on the sleeve 112. This sleeve has a vertical movement on the post 90, but does not revolve thereon. The forks of bar 108 rest on washer 111, secured to post 90. When, as before stated, the bar 49 is moved laterally through its connection with the pattern mechanism to release pawl 39, it at the same time actuates lever 107, which in turn imparts a sliding movement to bar 108, causing the high part of cam 109 to ride under pin 110, thereby elevating the sleeve 112 and moving sleeve 93 and rocking lever 92 into operative position.

As before described, after the required length of wide fabric has been knit and the stocking-leg completed and it is desired to start on the narrow work to commence a new stocking-leg the rolls are returned to their initial position by the pins 94 and 94' necessarily striking the lugs 106 and 106'. During this return movement of the rolls the yarn-carrier should be raised out of operative position to press the yarn from the fashioning-needles. The following means are provided for so raising the yarn-carrier during the last complete revolution of the rolls:

119 is the yarn-carrier, pivoted near one end on a bracket 118, secured to the cam-plate 10.

117 is a spring secured at one end to the yarn-carrier and at the other end to the cam-plate and normally holding the yarn-carrier down in operative position.

119' is a roller on the yarn-carrier back of its pivot.

Secured to bearing 15$^b$ is a bracket 122. (See Figs. 5 and 6.) Secured to cam-guide 121 is a bracket 123. 124 is a rock-shaft in bearings in said brackets, one end of said shaft projecting beyond the bracket 122.

Secured to rock-shaft 124 are supports 125 125, to which is secured the cam-bar 126, which when depressed by the turning of rock-shaft 124 engages the roller 119' and raises the yarn-carrier out of operation. Normally, however, the cam-bar is held out of operative position by means of a coil-spring 127 on the rock-shaft 124, one end of which coil-spring engages the bracket 123 and the other end of which is secured to a collar 127', secured to said rock-shaft.

In order to turn the rock-shaft 124, the following mechanism is provided: To the end of the rock-shaft projecting beyond bracket 122 is secured a block 128, to which is pivoted the lever 129. Pivoted between its ends to bearing 15$^b$ is a lever 130, the upper end of which is connected by link 131 to the lever 129, the lower end being connected to one end of a spring 132, the other end of which spring is secured to the frame of the machine.

Secured to gear 17' is the cam 133, having a low point on its periphery (clearly seen in Fig. 3) which is brought opposite the lever 129 at the first of the six turns of the rolls before described. The lever 129 is normally held out of engagement with the cam 133 by means of the spring 132, and consequently is free to allow the spring 127 to move the cam-bar 126 to its upper inoperative position. At this first turn of the rolls preparatory to returning the rolls to their initial position, as before described, the lever 129 is moved, by means to be described, onto the low point on the periphery of the cam 133. During the remaining five turns of the rolls the lever 129 rides on the high part of cam 133, causing said lever to be turned in a direction at right angles to the direction of its pivotal movement, thereby turning the block 128, and thus causing the rock-shaft 124 to be turned and cam-bar 126 to engage the roller 119' and the yarn-carrier 119 to be raised into its inoperative position. As before described, it is during one of these five turns that the rolls 15 and 16 are returned and during another of these five turns that the rolls 17 and 18 are returned, so that it will be understood that the yarn-carrier is raised out of operative position at each reciprocation until after both rolls are returned to their initial positions.

It will be understood that the cam-bar 126 is of such length and is located in such position that it will operate upon the yarn-carrier only when the latter is passing over the fashioning-needles, so that the yarn-carrier will spring into operative position whenever it passes over the non-fashioning needles. It is not important, therefore, for how long a time the lever 129 remains in engagement with the cam 133, so long as it is disengaged therefrom some time during the knitting of the narrow work with which a new stocking is commenced.

The following means are provided to move the lever 129 into engagement with the cam 133: Extending from the lower end of lever 130 is an arm 134, having a projection 134'. When shaft 81 is turned to operate lever 82' and bar 49', as before described, the latter strikes the projection 134', thereby moving lever 130 against the tension of spring 132, whereby the lever 129 (which at this time, as before described, is opposite the low point of the periphery of cam 133) is drawn onto said low point and in engagement with said cam, then operating at the next turn of the rolls, as before described, to operate the chain of mechanism for raising the yarn-carrier. When the shaft 81 is turned back to its original position, thus withdrawing bar 49', the spring 132 returns lever 129 to its original position out of engagement with cam 133 and the spring 127 returns the cam-bar 126 to its normal inoperative position, thereafter permitting the yarn-carrier to stay in operative position until the knitting of the next stocking is completed.

The knitting-cams will now be described. (See Figs. 8, 9, 10, and 11.)

140, 141, 142, 143, 144, 145, 146, and 148 are the knitting-cams secured to the cam-plate 9, the left-hand end of the cam-plate as illustrated in Figs. 8 and 9 being the forward end thereof. The slide-cam 140 is moved laterally from the dotted-line position to the full-line position, as shown in Fig. 8, by the shanks of the needles striking it on the forward movement—that is, from right to left, Fig. 8—of the cam-plate and is returned to the dotted-line position by momentum at the end of the forward stroke. The switch-cam 144 is pivoted to one of the guides 161 and is moved outwardly by the spring 144' into the full-line position, so as to direct the needles inside it, and thus raise them in the direction of their length into position to knit during the forward movement of the cam-plate, and is moved outwardly into the dotted-line position against the action of spring 144' when the needles pass outside it on the back stroke of the cam-plate. The guard-cam 143 extends between and is pivoted to the fixed cam 145 and the cam-plate and is held in the dotted-line position against the cam 142 during the back stroke of the cam-plate by means of the spring 143' and is moved outwardly against the tension of the spring 143' by the shanks of the needles striking it during the forward stroke of the cam-plate. By thus holding the cam 143 against the cam 142 during the back stroke of the cam-plate I prevent the needles from accidentally rising during this return movement and passing inside the cam 143, which would throw the stitches off the needles. The stitch-cam 142 has inclined inner and outer edges or guideways for the needles and by means to be hereinafter described is moved from the dotted-line position to the full-line position for the purpose of acting upon the needles engaged by its outer inclined edge to draw down the stitch during the forward stroke of the cam-plate and is moved back again to the dotted-line position during the back stroke of the cam-plate, so as to avoid the drawing down of the stitches during this stroke of the cam-plate when the needles are not knitting. The cam 148 is a guard-cam held in position by spring 148' and prevents any of the needles accidentally rising and passing inside of cam 142 during the back stroke of the cam-plate.

141 is a stationary inner guide-cam. 145 and 146 are stationary outer guide-cams.

The full lines in Fig. 8 represent the positions of the movable cams during the forward stroke of the cam-plate when the needles are caused to knit, and the dotted lines represent their positions during the back stroke of the cam-plate.

The following means are provided for acting upon the single needle, which is elevated above the rest by means of the projection $x$ of the roll 16:

149 is a block sliding in a groove cut in the plate. 147 is a needle-shifter cam secured to said block. At that back stroke of the cam-plate during which one of the needles is to knit upon the opposite bank, as before described, the needle-shifter 147 is moved by the block 149 into the position shown in Fig. 9. None of the needles except the one that it is desired shall knit with the opposite bank are raised high enough out of the needle-bed to engage the needle-shifter 147, and they therefore pass inside cams 146 and 145 and outside cams 148 142 143 144 and are held out of operation. The needle which it is desired to throw into action, however, is raised high enough out of the needle-bed (see Fig. 11) to be engaged by the needle-shifter 147, being thereby moved so as to throw in the guard-cam 148 and pass inside the stitch-cam 142, which causes it to knit with the needles of the opposite bank, the needle then passing down outside cams 140 and 144, where it is depressed to the level of the other needles.

The block 149 and needle-shifter 147 are operated as described just at the time that the needle-shifter is brought opposite the high-raised needle, and this operation is effected by means of the following mechanism:

150 is a lever pivoted near one end to the cam-plate. (See Fig. 10.) The lever is slotted at its long end to receive a pin 149', secured to block 149. The short end of the lever is secured to a spring 150', fastened to the cam-plate. This spring normally holds the lever 150, block 149, and cam 147 out of action. To actuate the lever 150 to move the cam 147 into operative position, a roller 157 is secured to the lever between its long end and its pivot and a cam 151 is adapted to actuate the roller. (See Figs. 11 and 17.) This cam is sustained by a block 152, secured to a rock-shaft 153, extending through bearings 154, secured to the frame or slide 20.

155 is a cam secured to gear 21'. (See Figs. 12 and 17.) This cam is concentric except at one point where a depression is provided.

156 is a dog secured to the rock-shaft 153 and engaging cam 155. When the gear 21' is turned into the position it occupies when the rolls are in position to dictate the uplifting of the needle designed to knit with the opposite bank, the dog 156 is brought opposite the depression of cam 155 and the block 152 drops by its own weight, the dog dropping into the depression of cam 155 and the cam 151 being moved by the block into position to engage the roller 157. When in the back stroke of the cam-plate the cam 151 engages the roller 157, the lever 150 is actuated to move the needle-shifter 147 into operative position. As the cam 151 is carried by the slide 20, it follows that as the knitting progresses the cam is moved forwardly step by step with the rolls, so that the cam 151 is always in the appropriate position to effect the movement of the needle-shifter cam 147 just at the time that said needle-shifter cam is brought opposite the particular needle that in a given point of knitting it is designed should knit with the needles of the opposite bank.

To actuate the stitch-cam 142 for the purpose hereinbefore stated, the following means are provided. This cam is secured to a block 158, sliding in a groove in the cam-plate. (See Fig. 10.) Extending through this block is a screw, which extends beyond the block a short distance to form a projection 158'.

160 is a sliding cam sliding in guides 161 161 on the cam-plate and adapted when shifted to one extreme position to engage the projection 158' to move the block 158 outwardly against the action of the leaf-spring 159 and move it into position to move the cam 142 outwardly into the full-line position shown in Fig. 8. When the sliding cam 160 is shifted into the other extreme position, the spring 159 is free to move the block 158 into position to move the cam 142 inwardly into the position shown in dotted lines in Fig. 8. It is therefore necessary to shift the sliding cam 160 at the end of each stroke of the cam-plate. To accomplish this, the sliding cam 160 has secured to it a projection 162, which is adapted to be struck by lugs 163 163, (see Fig. 1,) secured at each end of the cam-guide 120, thereby shifting the sliding cam 160 back or forth at the end of each stroke of the cam-plate.

164 is a latch-opener (see Figs. 1, 3, 8, 9, 10 and shown enlarged Figs. 19, 20, and 21) pivoted to the cam-plate opposite the cam 144, which guides the needles into position to knit. The function of the latch-opener is to open the latches of the needles preparatory to knitting upon them. The pivot of the latch-opener is above and transversely opposite the latch end of the needle. From its pivot the latch-opener extends upward, thence extends downward in a direction oblique to the plane of the needle-bed and toward a point in advance of the latch end of the needles when the latter are in their normal position, and thence curves downwardly and inwardly toward the needles, the sharp edge of the latch-opener being normally in alinement with the latch of the needle, so that as the needle is moved inwardly and upwardly preparatory to knitting the sharp edge of the latch-opener engages the latch and opens it. (See Fig. 20.) The latch-opener is held in the described position by means of the spring 165. If, as often happens, the end of one of the needles should be bent up above the level of the needle-bed, as shown somewhat exaggerated in Fig. 21, the hook of the needle will engage the concave end of the latch-opener and raise it a distance sufficient to enable the needle to ride over its edge, thereby opening the latch. Normally the latch-opener is stationary and is in proper position to open the latches of the needles, the latch-opener only yielding to permit it to act upon any needle that may be bent out of alinement.

166 167 are the ordinary sinker-cams.

It will be understood that the knitting-cam, the latch-opener, and all the mechanism attached to and moving with the cam-plate 9, as just described, are duplicated on the other cam-plate 10 and that the described actuating mechanism for such cams is also duplicated on the other side of the machine.

In order to throw the knitting mechanism out of action in case of any derangement of the knitting mechanism which would tend to jam or throw an abnormal strain upon the knitting-cam plates, I have provided means whereby under such circumstances the cross-head 170 (to which the cam-plates are secured) will be automatically disengaged from the cross-head 7. (See Figs. 13, 14, 15, and 16.)

The cross-head 170 is provided with a flange 172, resting in a groove in the cross-head 7. Extending through and projecting beyond an orifice 175 in the cross-head 7 is a locking-pin 173, having a tapered or conical head entering a correspondingly-shaped recess in the cross-head 170. The orifice 175 is of the same diameter for a portion of its length as the head of the locking-pin, but is contracted at its outer end to the diameter of the shank of the locking-pin. 174 is a spring in said orifice, said spring surrounding the shank of the locking-pin and bearing at one end against the shoulder formed at the junction of the contracted and enlarged section of orifice 175 and bearing at the other end against the head of locking-pin 173 and normally holding its conical end in the recess in cross-head 170, thereby normally holding the cross-heads 7 and 170 in connection.

176 is a pin extending through a slot 177 in cross-head 7 and entering an orifice in the locking-pin 173 and preventing it from turning, while permitting the locking-pin to move out of engagement with the cross-head 170. 178 is another pin, extending through an orifice 179 in cross-head 7 and abutting against the locking-pin 173.

180 is a notch in the locking-pin 173.

181 is a coil-spring surrounding the pin 178 and resting against a collar 182 on said pin and holding said pin against the locking-pin 173. The pin 178 is thus adapted to enter the notch 180 in locking-pin 173 when the latter is forced out of engagement with the cross-head 170.

In case of any derangement of the knitting mechanism tending to jam or throw an unusual strain upon the knitting-cam plates the locking-pin 173 will be forced out of its recess and the pin 178 will spring into the notch 180 in the locking-pin 173, holding the latter in its retracted position after the cross-head 7 passes from under the cross-head 170. Thereafter the cross-head 7 will continue to reciprocate without affecting the cross-head 170, and the knitting mechanism will be held out of action until the machine is stopped and the defect remedied.

Having now fully described my invention, what I claim, and desire to protect by Letters Patent, is—

1. The combination, with the needle-bed, of a cam-plate, means to reciprocate said cam-plate forwardly and backwardly, the stitch-cam 142 behind the slide-cam, having an inclined inner edge, the switch-cam in advance of the slide-cam, and a needle-shifter 147 behind the stitch-cam, and means for sliding said needle-shifter inwardly during the back stroke of the cam-plate, beyond the rear end of the inclined inner edge of the switch-cam, thereby moving the needle-shifter into position to cause the needle in alinement therewith to engage said inclined inner edge of the stitch-cam and be moved thereby into knitting position.

2. The combination, with a bank of needles, of a cam-plate, means to reciprocate the cam-plate forwardly and backwardly, a needle-shifter and a stitch-cam carried by the cam-plate, the stitch-cam having an inner guideway, means for moving the needle-shifter inwardly opposite the inner guideway of the stitch-cam, and means to move one of said needles out of its normal position and into the path of travel of said needle-shifter, thereby causing said needle-shifter to move said needle into position to direct it along the inner guideway of the stitch-cam.

3. The combination, with a bank of needles, of a cam-plate, means to reciprocate the cam-plate forwardly and backwardly, a needle-shifter and a stitch-cam carried by the cam-plate, the stitch-cam having an inner guideway, means for moving the needle-shifter inwardly opposite the inner guideway of the stitch-cam, and means to move one of said needles out of its normal position and into the path of travel of said needle-shifter, thereby causing said needle-shifter to move said needle into position to direct it along the inner guideway of the stitch-cam, and a guard-cam adjacent to the stitch-cam adapted to yield to permit said needle to be so moved.

4. The combination, with the two banks of needles, and the stitch-cam of each bank, of means for moving one of the needles of one bank into a different position from the other needles of said bank, a needle-shifter on the cam-plate back of the stitch-cam, adapted when moved into operative position to direct said needle over the stitch-cam on the return movement of said knitting-cams and during the operation of the needles of the other bank, and a cam adapted to engage said needle and restore it to its normal position, thus causing said needle to knit with the needles of the opposite bank, and mechanism for moving said needle-shifter into operative position.

5. The combination, with the two banks of needles and a set of knitting-cams for each bank, of means to move, at a predetermined time, one of the needles of one bank into a different position from the other needles of said bank, a needle-shifter moving with the knitting-cams, and mechanism for moving said needle-shifter relatively to said cams to cause the same to shift said needle after the latter is so actuated.

6. The combination, with the two banks of needles and the knitting-cams for each bank, of means to move, at a predetermined time, one of the needles of one bank into a different position from the other needles of said bank, a needle-shifter moving with the knitting-cams, and mechanism for moving said needle-shifter relatively to said cams to cause the same to shift said needle after the latter is so actuated, a movable cam adapted when in operative position to engage and actuate said needle-shifter mechanism, and means to control the position of said cam.

7. The combination, with two banks of fashioning-needles and the knitting-cams for each bank, of the pattern-rolls adjacent thereto, means to move said rolls along the needle-bed, means enabling said rolls to actuate needles in alinement and to move, at a predetermined time, one of the needles of one bank into a different position from the other needles of said bank, a needle-shifter moving with the knitting-cams, and connections between the pattern-rolls and needle-shifter adapted to actuate the latter relatively to said cams to cause the same to shift said needle, after the latter is so actuated by said rolls, and during the operation of the needles of the other bank.

8. The combination, with two banks of fashioning-needles and the knitting-cams for each bank, of the pattern-rolls adjacent thereto, means to move said rolls along the needle-bed, means enabling said rolls to actuate needles in alinement therewith, and to move, at a predetermined time, one of the needles of one bank into a different position from the other needles of said bank, a needle-shifter, moving with the knitting-cams, mechanism for moving said needle-shifter to cause the same to shift said needle, a movable cam adapted when in operative position to engage and operate said needle-shifter mechanism, and connections between said pattern-rolls and said movable cam, whereby said cam is moved into and out of operative position.

9. The combination, with the two banks of needles and the knitting-cams for each bank, of the pattern-rolls, means to move said rolls along the needle-bed, means enabling said rolls to move one of the needles of one bank into a different position from the other needles of said bank, a needle-shifter moving with the knitting-cams and adapted, when moved into operative position, to shift said needle after the latter is so actuated, a pivoted lever connected with said needle-shifter, a roller on said lever, a movable cam adapted when in operative position to engage said roller and actuate the same to move said needle-shifter into operative position, and connections between the pattern-rolls and said movable cam.

10. The combination, with the two banks of needles and the knitting-cams for each bank, of the pattern-rolls adjacent thereto, means to move said rolls along the needle-bed, means enabling said rolls to move one of the needles of one bank into a different position from the other needles of said bank, a needle-shifter moving with the knitting-cams and adapted, when moved into operative position, to shift said needle after the latter is so actuated, a block to which said needle-shifter is secured, a pivoted lever engaging said block, a spring normally holding said lever and the needle-shifter out of operative position, a movable cam adapted when in operative position to engage said roller and move the same against the tension of its spring, and connections from the pattern-rolls to said movable cam.

11. The combination, with the two banks of needles and the knitting-cams for each bank, of the pattern-rolls adjacent thereto, means to move said rolls along the needle-bed, means enabling said rolls to move, at a predetermined time, one of the needles of one bank into a different position from the other needles of said bank, a needle-shifter moving the knitting-cams, and mechanism for moving said needle-shifter to cause the same to shift said needle, after the latter is so actuated, a movable cam adapted when in operative position to engage and actuate said needle-shifter mechanism, a rock-shaft sustaining said cam, and means controlled by the pattern-rolls to rock said shaft.

12. The combination, with the two banks of needles and the knitting-cams for each bank, of the rolls adjacent thereto, means to move said rolls along the needle-bed, means enabling said rolls to move, at a predetermined time, one of the needles of one bank into a different position from the other needles of said bank, a needle-shifter moving with one of the knitting-cams, and mechanism for moving said needle-shifter to cause the same to shift said needle, after the latter is so actuated, a movable cam adapted when in operative position to engage and actuate said needle-shifter mechanism, a block to which said cam is secured, a rock-shaft sustaining said block, a dog secured to said rock-shaft, a rotary cam with which said dog engages, and means to rotate said rolls and rotary cam in unison.

13. The combination, with the two banks of needles and the knitting-cams for each bank, of the rolls adjacent thereto, means to move said rolls along the needle-bed, means enabling said rolls to move one of the needles of one bank into a different position from the other needles of said bank, a needle-shifter moving with the knitting-cams and adapted, when moved into operative position, to shift said needle after the latter is so actuated, a block to which said needle-shifter is secured, a pivoted lever engaging said block, a spring normally holding said lever and the needle-shifter out of operative position, a movable cam adapted when in operative position to engage said roller and move the same against the tension of its spring, a block to which said cam is secured, a rock-shaft sustaining said block, a dog secured to said rock-shaft, a rotary cam with which said dog engages, and means to rotate said rolls and rotary cam in unison.

14. The combination, with the two banks of needles and a set of knitting-cams for each bank, of means to move, at a predetermined time, one of the needles of one bank into a different position from the other needles of said bank, a needle-shifter moving with the knitting-cams, and mechanism for moving said needle-shifter relatively to said cams to cause the same to shift said needle, after the latter is so actuated, and a pivoted guard-cam located opposite the needle-shifter and adapted to be engaged and moved by said needle while the latter is being shifted.

15. The combination, with the stationary needle-bed, of the reciprocating cam-plate, the knitting-cams carried thereby, a stitch-cam, a block on which said cam is mounted, a projection on said block, guides on the cam-plate, a cam slidable in said guides and adapted to engage said projection and move said block, and a lug adapted to engage and move said cam at each stroke of the cam-plate.

16. The combination, with the stationary needle-bed, of the reciprocating cam-plate, the knitting-cams carried thereby, a stitch-cam, adapted to be moved into and out of position to draw the stitches, a block on which said cam is mounted, a spring engaging said block and normally holding the stitch-cam in one position, a projection on said block, guides on the cam-plate, a cam adapted to slide in said guides, a projection on said sliding cam, the cam-slide, and a lug on the cam-slide which is adapted to engage the projection on the sliding cam and move the latter at each reciprocation of the cam-plate, whereby the sliding cam, at alternate reciprocations of the cam-plate, engages the projection on the block and moves the stitch-cam, against the action of the spring, into the other position.

17. In a straight-knitting machine, the combination with fashioning-needles, mechanism for successively moving said needles into operation and for moving and holding the same out of operation, a yarn-carrier, a roller on the yarn-carrier, a cam adapted to engage said roller and thereby move the yarn-carrier out of operative position, and means to move said cam into position to engage said roller.

18. In a straight-knitting machine, the combination, with fashioning-needles, of mechanism for successively moving said needles into operation and for moving and holding the same out of operation, a yarn-carrier, a rock-shaft, a cam secured thereto, and means to rock said shaft and means on the yarn-carrier adapted, when said shaft is rocked, to be engaged by said cam, whereby said yarn-carrier is actuated.

19. In a straight-knitting machine, the combination, with fashioning-needles, of mechanism for successively moving said needles into operation and for moving and holding the same out of operation, a yarn-carrier, a spring adapted to normally hold said yarn-carrier in operative position, a roller on the yarn-carrier, a rock-shaft, a cam on said rock-shaft adapted to engage said roller when the shaft is rocked and thereby move the yarn-carrier out of operative position, and means to rock said shaft.

20. In a straight-knitting machine, the combination, with the fashioning-needles, and the yarn-carrier, of pattern-rolls, means enabling said rolls to successively move said needles into operation, means for shifting said rolls into inoperative position, devices for moving said yarn-carrier out of operation and means to actuate said yarn-carrier-operating devices prior to said shifting of the rolls.

21. The combination, with fashioning-needles and the yarn-carrier, of pattern-rolls, a cam, mechanism for turning said rolls and cam in unison, mechanism for shifting said rolls longitudinally step by step in one direction, mechanism normally inoperative for returning said rolls longitudinally in the other direction, means enabling said rolls to move said needles out of knitting position at one point in their rotation and hold them out of knitting position during the return of the rolls, devices for moving the yarn-carrier out of operation normally inoperative but adapted to engage and be actuated by said cam, and means to move said roll-returning mechanism and yarn-carrier-actuating mechanism into operative position.

22. In a straight-knitting machine, the combination, with fashioning-needles and the yarn-carrier, of pattern-rolls, a cam, means for turning said pattern-rolls and cam in unison, a lever, connections between said lever and the yarn-carrier, and means to move said lever into engagement with said cam.

23. In a straight-knitting machine, the combination, with fashioning-needles and the yarn-carrier, of pattern-rolls, a cam, means for turning said pattern-rolls and cam in unison, a rock-shaft, a lever on the rock-shaft, a cam-bar on the rock-shaft adapted to operate said yarn-carrier, and means to move said lever into engagement with said cam.

24. In a straight-knitting machine, the combination, with fashioning-needles and the yarn-carrier, of pattern-rolls, a cam, means for turning said pattern-rolls and cam in unison, a rock-shaft, a lever on the rock-shaft, a cam-bar on the rock-shaft, a roller on the yarn-carrier, a spring normally holding said lever out of engagement with the cam, and means to move said lever into engagement with said cam, thereby subsequently causing said cam to actuate said lever to turn said shaft, thereby causing said cam-bar to engage said roller and lift said yarn-carrier out of operative position.

25. In a straight-knitting machine, the combination, with the regular and fashioning needles, the reciprocating cam-plate and the yarn-carrier carried thereby, of a tiltable cam arranged opposite the fashioning-needles only and adapted when tilted to engage and move the yarn-carrier out of operative position during its passage over the fashioning-needles, means for normally holding the yarn-carrier in operative position, whereby the same is always in operative position while passing over the regular needles, and means for tilting said cam.

26. In a straight-knitting machine, the combination, with the fashioning-needles and the yarn-carrier, of pattern-rolls, a cam, means for turning said rolls and cam in unison, a rock-shaft, a lever on the rock-shaft, a cam-bar on the rock-shaft, a roller on the yarn-carrier, a second lever connected with the first lever, a spring connected with the second lever, and means to operate said second lever.

27. The combination, with the fashioning-needles and the yarn-carrier, of pattern-rolls, means enabling said rolls to move said needles into position to be actuated, mechanism for shifting said rolls out of operative position, devices for unlocking said rolls to permit them to be so shifted, and mechanism for moving said yarn-carrier out of operative position, said yarn-carrier-operating mechanism being connected with the roll-unlocking devices.

28. The combination, with the fashioning-needles and the yarn-carrier, of rotatable pattern-rolls, means enabling said rolls to move said needles into position to be actuated, mechanism for shifting said rolls out of operative position, devices for unlocking said rolls to permit them to be so shifted, a cam turning with said rolls, mechanism for moving said yarn-carrier out of operative position, and connections between the yarn-carrier-operating mechanism and the roll-unlocking devices whereby the latter move the former into engagement with said rolls.

29. The combination, with fashioning-needles and the yarn-carrier, of pattern-rolls, mechanism for turning said rolls, mechanism for shifting said rolls longitudinally step by step in one direction, mechanism for returning said rolls longitudinally in the other direction, means enabling said rolls to hold said needles out of operation during the return of the rolls, devices for moving the yarn-carrier out of operation, a bar 49 adapted to move said roll-returning mechanism and yarn-carrier-operating devices into operative position, and means to operate said bar.

30. In a straight-knitting machine, the combination, with the fashioning-needles and the yarn-carrier, of pattern-rolls, means controlled thereby to operate said needles, roll-turning mechanism, mechanism for shifting said rolls forwardly step by step, mechanism for shifting said rolls backwardly out of operative position, means to actuate said pattern-rolls, a spring normally holding said yarn-carrier into operative position, a roller carried by said yarn-carrier, a rock-shaft, a cam-bar carried by said shaft adapted to engage said roller when the shaft is rocked, a lever connected with said rock-shaft so as to turn the same, a cam on the shaft of one of the pattern-rolls, a second lever pivoted between its ends, a link connecting one end of said second lever with said first lever, a spring acting upon the other end of said second lever and normally holding the first lever out of engagement with said cam, a projection on the other end of said second lever, and a bar actuated by the pattern mechanism and adapted to engage said projection to move the first lever into engagement with the cam.

31. The combination, with the needles, of a latch-opener extending from a point transversely opposite the needle-bed toward a point in advance of the needles and thence extending toward the needles, and means enabling said latch-opener to yield upwardly when engaged by a needle to enable the edge of the end of the latch-opener to open the latch.

32. The combination, with the needles, of a yieldingly-supported latch-opener having a curved end portion, the concave side of which is in line of movement of a needle raised above the level of the needle-bed, whereby when said needle strikes said curved end it will lift said latch-opener and ride along and beyond its edge.

33. The combination, with the needles, of a spring-supported latch-opener pivoted at a point transversely opposite the latch end of the needle and extending obliquely toward a point in advance of the needles and thence bent upon itself toward the needles.

34. The combination, with the needles, of a latch-opener, the end whereof extends transversely to the plane of the needle-bed, and means enabling said latch-opener to yield in a direction transverse to the plane of the needle-bed when engaged by a needle.

35. The combination, with the needles, of a latch-opener having a curved end and sharp edge, said curved end extending transversely to the plane of the needle-bed, the concave side of which is adapted to be engaged by a needle whose latch end is displaced out of its bed, said latch-opener being yieldingly supported so that, when its curved end is so engaged by said needle, it will be moved thereby away from the plane of the needle-bed until said needle rides beyond its edge.

36. The combination, with the needles, of a latch-opener pivoted above and transversely opposite the latch end of the needles and extending upward, thence in a direction oblique to the plane of the needle-bed and toward a point in advance of the needles, and thence curved downwardly toward the needles, the edge of the end thereof being normally in line of movement of the latches of the needles, a spring normally holding said latch-opener in its normal position, but permitting the latch-opener to move away from its normal position when the concave side of its curved end is engaged by a needle displaced from its normal position.

37. In a straight-knitting machine, the combination, with the cam-plate, of a cross-head 7, a rod 8 on which said cross-head is adapted to reciprocate, means for reciprocating said cross-head, a rod 171, a cross-head 170 adapted to reciprocate on the rod 171, links connecting the cam-plates and cross-head 170, and a yielding connection between the two cross-heads adapted to be severed in the event of resistance to movement of the cam-plates.

38. In a straight-knitting machine, the combination, with the cam-plates, of a cross-head, means for reciprocating the same, a second cross-head connected with the cam-plates, one of said cross-heads having a conical recess, a locking-pin, having a tapered head, carried by the other cross-head, a spring normally seating said pin in said recess, whereby the two cross-heads are detachably secured together, a second pin in the last-named cross-head, and a spring normally holding the second pin against the locking-pin and adapted to move said second pin into locking engagement with the locking-pin when the latter is forced out of said conical recess.

39. In a straight-knitting machine, the combination, with the cam-plates, of a cross-head, means for reciprocating the same, a second cross-head connected with the cam-plates, and having a conical recess, a locking-pin, having a tapered head, carried by the second cross-head, a spring normally seating said pin in said recess, whereby the two cross-heads are detachably secured together, a second pin in said second cross-head, a spring normally holding the second pin against the locking-pin, and a notch in the locking-pin adapted to receive the head of the second pin when the locking-pin is forced out of said conical recess.

40. In a straight-knitting machine, the combination, with the cam-plates, of a cross-head, means for reciprocating the same, a second cross-head connected with the cam-plates, and having a conical recess, a locking-pin, having a tapered head, carried by the second cross-head, a spring normally seating said pin in said recess, whereby the two cross-heads are detachably secured together, a second pin in said second cross-head, a spring normally holding the second pin against the locking-pin, and a notch in the locking-pin adapted to receive the head of the second pin when the locking-pin is forced out of said conical recess, and a third pin extending through a slot in the second cross-head and engaging an orifice in the locking-pin to prevent the latter from turning.

In testimony of which invention I have hereunto set my hand, at Philadelphia, on this 4th day of May, 1903.

HARRY A. HOUSEMAN.

Witnesses:
M. F. ELLIS,
M. M. HAMILTON.